Figure 1:
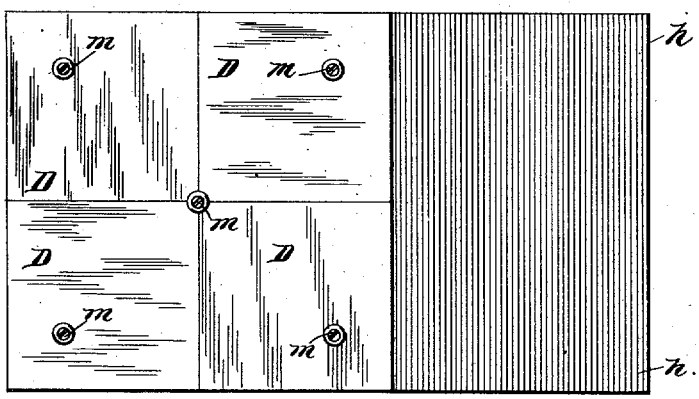

No. 12,127. REISSUED JUNE 30, 1903.

M. BENSINGER.

REFRIGERATOR.

APPLICATION FILED OCT. 15, 1902.

Witnesses:

J. Schilling

A. Noack

Inventor:

M. Bensinger

By atty

J. N. McIntire

No. 12,127. Reissued June 30, 1903.

UNITED STATES PATENT OFFICE.

MOSES BENSINGER, OF CHICAGO, ILLINOIS, ASSIGNOR TO THE BRUNSWICK-BALKE-COLLENDER CO., OF CHICAGO, ILLINOIS, A CORPORATION OF OHIO.

REFRIGERATOR.

SPECIFICATION forming part of Reissued Letters Patent No. 12,127, dated June 30, 1903.

Original No. 677,431, dated July 2, 1901. Application for reissue filed October 15, 1902. Serial No. 127,428.

*To all whom it may concern:*

Be it known that I, MOSES BENSINGER, of Chicago, county of Cook, and State of Illinois, have invented a new and useful Improvement in Refrigerators; and I do hereby declare that the following is a full, clear, and exact description of the same, reference being had to the accompanying drawings, forming part of this specification.

My invention relates to portable refrigerators or ice-boxes, the inner and outer surfaces of the walls of which are covered with tiles, and particularly to that species of such refrigerators in which the tiles on the outside are secured to the wooden walls of the box by gluing or cementation.

As is well known to those skilled in the comparatively new art of making refrigerators or ice-boxes which are lined interiorly with tiles (usually white porcelain tiles) and also present exterior tiled surfaces, such refrigerators have always until very lately had the porcelain tiles used to completely cover both the interior and exterior surfaces of the wooden box-like structure fastened to the wooden surface by screws passing through the tiling and into the woodwork of the box, though for some time past I have manufactured and sold tiled refrigerators having the exterior tiling fastened to the wood of the box or box-frame wholly by gluing, and hence without the use of any screws or other analogous securing devices, and the result of this construction dispensing with the securing devices at the exterior of the refrigerators has resulted in a much more unique and cleanly-appearing refrigerator, which has gained great favor with the public and has been largely made and sold by me. Time has, however, demonstrated that while the article of manufacture thus produced with perfect exterior surfaces of porcelain tiling is a most desirable and the most acceptable thing for the price at which it can be made and sold the beautiful exterior tiled surfaces of the box will become marred and unsightly by the cracking or splitting apart of some of the tiles here and there, owing to the shrinkage of the thin boards or wooden pieces constituting the outer veneer or board surface of the box.

By the use of thoroughly-seasoned stuff in the manufacture of the box-frames or skeletons onto which are subsequently fastened by gluing the tiles composing the exterior surfaces of the refrigerator it was thought that a perfectly durable article was produced; but time and usage have demonstrated that while the interior "tile" lining (so to speak) of this species of ice-boxes remains perfect, the tiles never being affected by any shrinkage of the inner veneers or wooden walls of the box, the tiles glued onto the exterior surface of the outer wooden walls of the box will eventually split and crack and become spoiled, thus marring the external appearance of the article and necessitating repairs, which have usually to be made by or at the expense of the manufacturer to maintain his reputation with the trade and satisfy his customers. Furthermore, it has been proved to be an exceedingly troublesome and expensive job to make such repairs, it requiring great pains and labor on the part of a skilled workman to remove the spoiled tiles for the substitution of new perfect ones. On account of the refractory nature of the porcelain tile and the tenacity with which its glued surfaces adhere to the wooden surface to which it was secured in the manufacture of the refrigerator it is exceedingly difficult for the most skilled workman to chisel off completely the spoiled tile without breaking or injuring the adjacent edges of the frangible neighboring tiles. Hence the eventual breakage or mutilation of a tile here and there in the manner mentioned not only spoils the external appearance of the refrigerator, necessitating repairs, but it is exceedingly difficult and expensive to repair the damaged tiles.

I have discovered as the result of experiment that if the outer surface of the well-seasoned outer wooden wall of the box-frame be first covered with thick paper or a sheet fabricated of paper and muslin combined cemented or glued onto it and the porcelain tiles be subsequently fastened by gluing to the exposed surface of this paper (or combined paper and muslin) surface the tiles, while they will be as securely and durably fastened in place, will never become split, cracked, or otherwise injured.

It is supposed that the damaging of the exterior tiles in porcelain-covered refrigerators as made previous to my invention has been due to the facts that the wood surfaces to which they were glued, absorbing moisture from the liquid glue, would swell or expand some during the process of attachment of the tiles to the wood and that then, subsequently to the formation of the perfectly-adhesive joint between the wood and its porcelain covering, a shrinkage of the wooden boards due to their drying out has caused them in drawing slightly apart or away from each other to split or crack a tile, part of which may have been glued fast to one board and the other part to another board; but whatever may have been the cause or causes of the injury in time to the tiles the fact is that such injury has occurred, with the serious consequences I have mentioned. It is supposed that by the intervention between the wooden surface and the tile-backs of a sheet of fabricated material, such as thick paper or combined paper and muslin, (or cotton cloth,) the paper being first glued to the wood, and these combined ingredients being allowed to become thoroughly dried out and the tiles then glued to the (so to speak) "papered" wooden wall of the box-frame, the moisture in the glue used to fasten on the tiles does not affect the wood, but is absorbed wholly by the layer of paper and that the paper in subsequently drying out does not in the operation of contraction perceptibly affect the tiles, because although the paper expands when moistened and contracts in drying out, (even to a greater extent, perhaps, than would a wooden surface,) in swelling its particles and material portions of its continuous surface expand into the usual recesses, corrugations, or crevices of the tile backs (with which recess-surfaces the paper is not glued fast) and in drying out contract into the normal condition, and, furthermore, that the expanding and contracting paper surface being a continuous one cannot, like the wooden surface of a series of boards, have any lines of separation created by the expanding and contracting operations of the material. However, be this supposition correct or the *rationale* of the matter different therefrom, the fact is that in a tile-covered refrigerator the same in all other respects as those heretofore made, but having the paper placed intermediately of the wood and porcelain surfaces, the tiles do not become split, cracked, or otherwise injured in the course of time.

My invention is therefore based on the idea of a new use of an ordinary paper layer or a sheet of well-known combined paper and muslin fabric placed intermediately of the outer surface of the wooden wall of the box and the back of the tile covering, said fabricated sheet being first glued to the wood and the tile-back subsequently glued to the paper to effectuate a securement in place of the outer tile without danger of any subsequent cracking of or injury to the tile.

To enable those skilled in the art to which my invention relates to make and use refrigerators embodying it, I will now proceed to more fully describe it, referring by letters to the accompanying drawings, in which I have shown my improvement carried out in that precise form in which I have so far successfully and extensively practiced it.

Figure 2:
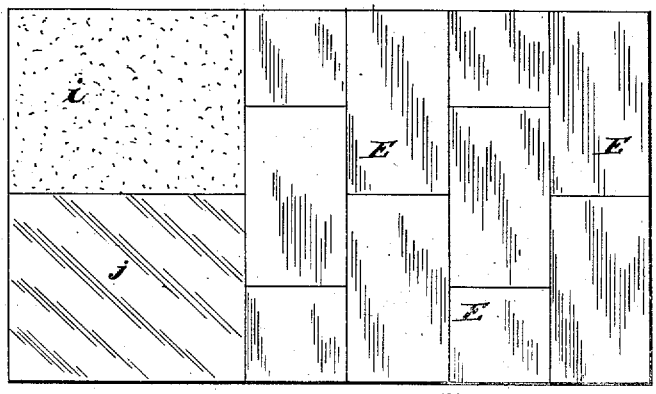
Figure 3:
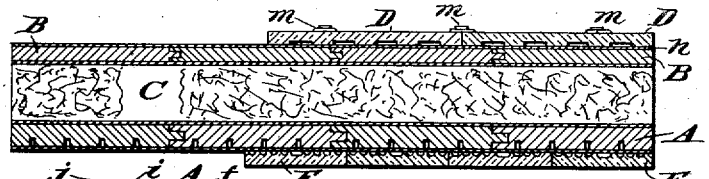
Figure 4:
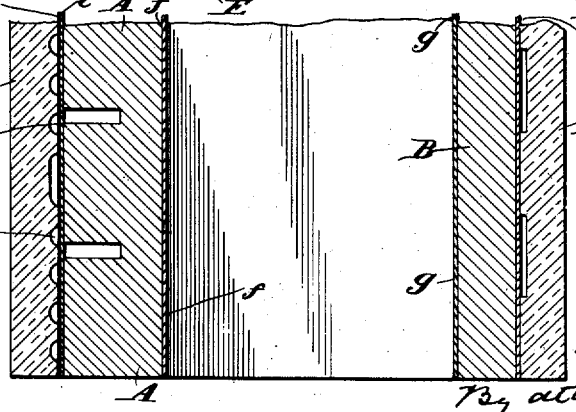

In the drawings, Figure 1 is an elevation of a section or of a portion of one of the sides of a tiled portable refrigerator or ice-box made according to my invention viewed from within the box. Fig. 2 is a similar view looking at the exterior of the refrigerator. Fig. 3 is a top view of the section shown in side views at the other two figures. Fig. 4 is a view similar to Fig. 3, but showing a smaller section or portion drawn on a larger scale (about full size) to better show the several structural features.

In all the figures the same part will be found always designated by the same letter of reference.

I may remark here that at Fig. 2 I have shown that portion of the box-frame on which the tiles have not yet been placed as exhibiting the two species of fabricated covering to which I have hereinabove referred—*i. e.*, a covering of paper only and a covering of a combined paper and muslin fabric.

A is the outer wooden wall of the box, composed, as usual, of well-seasoned soft-wood stuff tongued and grooved together, (the stuff in the case shown being about three-quarters of an inch full in thickness,) while B is the inner wall or veneer, made of about half-inch stuff, these two walls being securely fastened to the intermediate frame-pieces C, (in the case shown about one and one-sixteenth of an inch thick,) all in a well-known manner. As usual, the space intermediate of the two wooden walls A and B is filled in or packed with some suitable material non-conductive of heat, and the inner or adjacent surfaces of the walls A and B are, as usual, completely covered, in the process of building the box-frame, with layers of thick paper, also used, as is well known, for the purpose of enhancing the non-conductive quality of the refrigerator. These linings of paper, which are old in the art, are clearly seen at *f* and *g*, (see particularly Fig. 4,) and at *h* is shown the paper covering on the inner or tiled surface of the box-wall B, applied in about the usual manner by being tacked here and there to the wood.

D represents the tiles constituting the porcelain interior lining of the refrigerator, arranged in the customary approved manner and secured to the wooden wall B by means of wood-screws *m*, provided with washers under their heads and screwed into the woodwork, as usual.

The external surface of the wooden wall or veneer A is completely covered with a sheet of either paper alone, (the same sort as that employed at *f* and *g* may be used,) as seen at

*i*, Fig. 2, or a sheet of fabric composed of paper combined with muslin, as seen at *j*, Figs. 2 and 4, which is permanently fastened to the wooden surface by gluing or cementation through the medium of any suitable adhesive material properly applied. After having thus "papered," so to speak, the outer surface of A the united parts are left to dry a suitable length of time until any moisture contained in the adhesive mixture used and absorbed by both wood of A and the paper covering (*i* or *j*) shall have completely dried out. Then the tiles E are applied and secured to the outer or exposed surface of the papered wall A by gluing them thereon. To perfectly and durably thus fasten on the tiles E, I have found cabinet-makers' glue to perfectly answer the purpose, and from my experience so far in manufacturing my improved refrigerators I deem this the best adhesive mixture for the purpose. As shown, the back (or unglazed surface) of each tile E has the usual series of parallel depressions, grooves, or recesses *s*, so that the adhesive jointure between the fabric *i j* and the back of each tile exists only where the higher or raised portions of the corrugated tile-back contact with the glue-coated surface of the paper.

In actual practice and by experience the fact has been demonstrated that when the exterior wooden wall A has the tiles E combined with and secured to it in the manner shown and described—*i. e.*, by means of or through the medium of a paper covering first secured to the wooden surface and the tiles subsequently glued onto the said paper—there occurs no subsequent cracking of or injury to the thus tiled surface of the refrigerator, and that thus by my invention a great desideratum is gained. Furthermore, as hereinabove explained, in the event of the necessity for the replacement by a new tile of any one broken or injured in any manner (as, for instance, by a blow given in some way to the tile exteriorly) my improvement renders comparatively easy and inexpensive such requisite repair. Of course the addition of the papering of the exterior surface of the wall A for the purposes of my invention incidentally increases the non-conductiveness of the ice-box.

Having now so fully explained the nature of my invention and the best mode now known to me of carrying it out that those skilled in the art can readily understand and practice it, what I claim as new, and desire to secure by Letters Patent, is—

1. In a tiled refrigerator, the combination with the outer wooden wall; and the outer tile covering, of an intermediately-located layer of paper, or equivalent fabric, glued or cemented to said wooden wall and to which the tiles are glued or cemented; all substantially as and for the purposes set forth.

2. A tiled wall comprising a wall-surface; a covering of paper or combined cloth and paper cemented to said wall-surface; and tiles cemented, at their backs, to the said covering; all substantially as set forth.

3. The combination with a wall; and a paper or combined cloth and paper covering, cemented to the surface of said wall, of tiles having their backs cemented to the said wall-covering; all substantially as set forth.

In witness whereof I have hereunto set my hand this 1st day of October, 1902.

M. BENSINGER.

In presence of—
EDWARD F. BAYER,
J. N. MCINTIRE.